United States Patent
Ikada et al.

(10) Patent No.: US 9,610,631 B2
(45) Date of Patent: Apr. 4, 2017

(54) SWAGING TOOL

(71) Applicant: MITSUBISHI HEAVY INDUSTRIES, LTD., Minato-ku, Tokyo (JP)

(72) Inventors: Akira Ikada, Tokyo (JP); Taro Takeuchi, Tokyo (JP); Yuki Tsukioka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/029,247

(22) PCT Filed: Dec. 3, 2014

(86) PCT No.: PCT/JP2014/082049
§ 371 (c)(1),
(2) Date: Apr. 13, 2016

(87) PCT Pub. No.: WO2015/083756
PCT Pub. Date: Jun. 11, 2015

(65) Prior Publication Data
US 2016/0256916 A1    Sep. 8, 2016

(30) Foreign Application Priority Data
Dec. 6, 2013  (JP) .................................. 2013-253679

(51) Int. Cl.
*B21J 15/02* (2006.01)
*B21J 15/28* (2006.01)
(Continued)

(52) U.S. Cl.
CPC ............. *B21J 15/022* (2013.01); *B21J 5/022* (2013.01); *B21J 15/28* (2013.01); *B21J 15/285* (2013.01);
(Continued)

(58) Field of Classification Search
CPC ........ B21J 15/022; B21J 15/28; B21J 15/285; B21J 19/05; Y10T 29/53065; Y10T 29/53726; Y10T 29/53735
(Continued)

(56) References Cited

U.S. PATENT DOCUMENTS 3,792,933 A    2/1974  Stencel
3,983,304 A  * 9/1976  Sekhon ................ C09D 161/06
                                                          29/34 B
(Continued)

FOREIGN PATENT DOCUMENTS

JP          36-5561 B1      5/1961
JP       2003-506220 A      2/2003
(Continued)

OTHER PUBLICATIONS

William L. Roberts, Cold Rolling of Steel, 1978, p. 316.*
(Continued)

*Primary Examiner* — David B Jones
(74) *Attorney, Agent, or Firm* — Hauptman Ham, LLP

(57) ABSTRACT

A swaging tool in which the pinhead of a fastening pin is positioned on one plate of a pair of plates through which the fastening pin is passed, the pintail of the fastening pin is positioned on the other plate, a collar mounted on the pintail side of the fastening pin is moved to the pinhead side so as to be brought into contact with the plate, the collar is swaged to the fastening pin in the state of contact with the plate, and a tensile load is applied to the pintail to break and remove the pintail, whereby the pair of plates are fastened; wherein the tool is provided with a swage die in which there is formed a swaging hole that is brought into contact with the collar to swage the collar, a low-friction coating film being formed on the inner peripheral surface of the swaging hole.

9 Claims, 2 Drawing Sheets

(51) Int. Cl.
    *F16B 5/04*   (2006.01)
    *F16B 19/08*  (2006.01)
    *B21J 5/02*   (2006.01)
    *F16B 19/05*  (2006.01)

(52) U.S. Cl.
    CPC ............... *F16B 5/04* (2013.01); *F16B 19/05* (2013.01); *F16B 19/08* (2013.01)

(58) Field of Classification Search
    USPC .................................................. 29/243.522
    See application file for complete search history.

(56) References Cited

U.S. PATENT DOCUMENTS

| | | | | |
|---|---|---|---|---|
| 4,557,033 A | * | 12/1985 | Champoux | B23P 9/025 29/243.529 |
| 5,548,889 A | | 8/1996 | Smith et al. | |
| 6,742,376 B2 | * | 6/2004 | Easterbrook | B21C 23/001 72/334 |
| 7,921,530 B2 | * | 4/2011 | Mercer | B21J 15/022 29/243.529 |
| 2004/0028500 A1 | | 2/2004 | Monserratt et al. | |
| 2006/0042069 A1 | | 3/2006 | Donovan | |
| 2009/0003964 A1 | | 1/2009 | Keener et al. | |

FOREIGN PATENT DOCUMENTS

| | | |
|---|---|---|
| JP | 2003-62902 A | 3/2003 |
| JP | 2004-190830 A | 7/2004 |
| JP | 2004-306040 A | 11/2004 |
| JP | 2013-176803 A | 9/2013 |

OTHER PUBLICATIONS

Written Opinion in International Patent Application No. PCT/JP2014/082049, mailed Mar. 3, 2015.
International Search Report mailed Mar. 3, 2015, in International Application No. PCT/JP2014/082049.
Extended European Search Report in EP Application No. 14867285.0, dated Aug. 25, 2016.

* cited by examiner

FIG. 3

| | SAMPLE | COEFFICIENT OF FRICTION |
|---|---|---|
| WITHOUT CETYL ALCOHOL | No.1 | 0.3558 |
| | No.2 | 0.3550 |
| | No.3 | 0.3597 |
| WITH CETYL ALCOHOL | No.4 | 0.0866 |
| | No.5 | 0.0576 |
| DLC | No.6 | 0.1289 |

SWAGING TOOL

RELATED APPLICATIONS

The present application is a National Phase entry of International Application No. PCT/JP2014/082049, filed Dec. 3, 2014, which claims priority of Japanese Application No. 2013-253679, filed Dec. 6, 2013.

TECHNICAL FIELD

The present invention relates to a swaging tool which fastens a fastened part by swaging a collar to a fastening pin.

BACKGROUND ART

In the related art, a hydraulic swaging tool which swages a collar to a fastening pin by actuating a piston in a cylinder by using a fluid is known (refer to, for example, PTL 1). Further, as a swaging tool, in addition to a hydraulic swaging tool, there is a swaging tool which actuates a piston in a cylinder by pneumatic pressure.

CITATION LIST

Patent Literature

[PTL 1] U.S. Pat. No. 5,548,889

SUMMARY OF INVENTION

Technical Problem

Incidentally, in a collar which is swaged by a swaging tool, a lubricant such as cetyl alcohol is applied to the surface (the outer surface) with which the swaging tool comes into contact. However, the lubricant comes off with time while it is handled. Here, in a case where the collar from which the lubricant came off is swaged by using the swaging tool of PTL 1, friction between the swaging tool and the collar increases. In this case, fastening failure in which a pintail breaks in a state where only a portion of the collar is swaged to a fastening pin easily occurs. If the fastening failure occurs, it is necessary to remove (the fastening pin and) the collar subjected to the fastening failure and perform fastening work again, and thus, workability is lowered.

Therefore, the present invention has an object to provide a swaging tool in which it is possible to suitably swage a collar to a fastening pin.

Solution to Problem

According to an aspect of the present invention, there is provided a swaging tool in which a pinhead of a fastening pin is located on one side of a fastened part into which the fastening pin is inserted, a pintail of the fastening pin is located on the other side of the fastened part, a collar mounted on the pintail side of the fastening pin is moved to the pinhead side so as to come into contact with the fastened part, the collar is swaged to the fastening pin in a state where the collar is in contact with the fastened part, and a tensile load is applied to the pintail, thereby breaking and removing the pintail, whereby the fastened part is fastened, the swaging tool including: a swaging die in which there is formed a swaging hole which is brought into contact with the collar, thereby swaging the collar, wherein a low-friction coating film is formed on an inner peripheral surface of the swaging hole.

According to this configuration, the low-friction coating film can be formed on the inner peripheral surface of the swaging hole which is formed in the swaging die, and therefore, even if a lubricant applied to the collar comes off, it is possible to suppress an increase in friction between the swaging tool and the collar. For this reason, even if the lubricant applied to the collar comes off, it becomes possible to suitably swage the collar to the fastening pin. Further, as low-friction coating, there is diamond-like carbon coating (DLC coating), diamond coating, titanium light coating, titanium aluminum coating, or the like.

Further, it is preferable that a coefficient of friction of the low-friction coating film is less than or equal to 0.35 and it is more preferable that the coefficient of friction of the low-friction coating film is less than or equal to 0.12.

According to this configuration, it is possible to suitably suppress an increase in friction between the swaging tool and the collar. Further, it is preferable that the coefficient of friction of the low-friction coating film is as low as possible.

Further, it is preferable that the low-friction coating film also has a function as a wear-resistant coating film.

According to this configuration, it is possible to suppress wear of the swaging hole which is formed in the swaging die. For this reason, it is possible to attain improvement in the tool life of the swaging tool.

Further, it is preferable that the low-friction coating film is a film formed by diamond-like carbon coating.

According to this configuration, is possible to make the low-friction coating film a coating film having low frictional properties and wear resistance.

Further, it is preferable that the diamond-like carbon coating is performed by physical vapor deposition.

According to this configuration, the DLC coating which is formed by physical vapor deposition (PVD) forms a coating into which it is difficult for hydrogen to enter at the time of film formation, and therefore, compared to a case of performing the DLC coating by, for example, chemical vapor deposition (CVD), it is possible to make the low-friction coating film a hard film. For this reason, even in the DLC coating, it is possible to make the low-friction coating film a coating film having lower frictional properties and more wear resistance.

Further, it is preferable that the swaging hole is formed such that a diameter thereof is wide on the inlet side on which the collar is pushed in, and is the narrowest at a top portion on the center side, and is wider than the diameter in the top portion on the outlet side, and the low-friction coating film is formed in at least an area from the inlet side to the top portion of the swaging hole.

According to this configuration, it is possible to form the low-friction coating film in an appropriate area with respect to the inner peripheral surface of the swaging hole.

According to another aspect of the present invention, there is provided a swaging tool in which a pinhead of a fastening pin is located on one side of a fastened part into which the fastening pin is inserted, a pintail of the fastening pin is located on the other side of the fastened part, a collar mounted on the pintail side of the fastening pin is moved to the pinhead side so as to come into contact with the fastened part, the collar is swaged to the fastening pin in a state where the collar is in contact with the fastened part, and a tensile load is applied to the pintail, thereby breaking and removing the pintail, whereby the fastened part is fastened, the swaging tool including: a swaging die in which there is formed a swaging hole which is brought into contact with the collar, thereby swaging the collar, wherein a coefficient of friction in an inner peripheral surface of the swaging hole is less than or equal to 0.35.

According to this configuration, the inner peripheral surface of the swaging hole which is formed in the swaging die can be formed in a smooth surface having low friction, and therefore, even if the lubricant applied to the collar comes off, it is possible to suppress an increase in friction between the swaging tool and the collar. For this reason, even if the lubricant applied to the collar comes off, it becomes possible to suitably swage the collar to the fastening pin. Further, more preferably, it is preferable that the coefficient of friction in the inner peripheral surface of the swaging hole is less than or equal to 0.12.

Further, it is preferable that a lubricant is applied to the collar before the collar is swaged.

According to this configuration, it is possible to more suitably suppress an increase in friction between the swaging tool and the collar.

BRIEF DESCRIPTION OF DRAWINGS

FIG. 3 is a table comparing coefficients of friction.

DESCRIPTION OF EMBODIMENTS

Hereinafter, examples according to the present invention will be described in detail based on the drawings. In addition, the present invention is not limited by these examples. Further, in constituent elements in the following examples, elements with which those skilled in the art can easily replace them, or substantially the same elements are included.

Example 1

Figure 1:
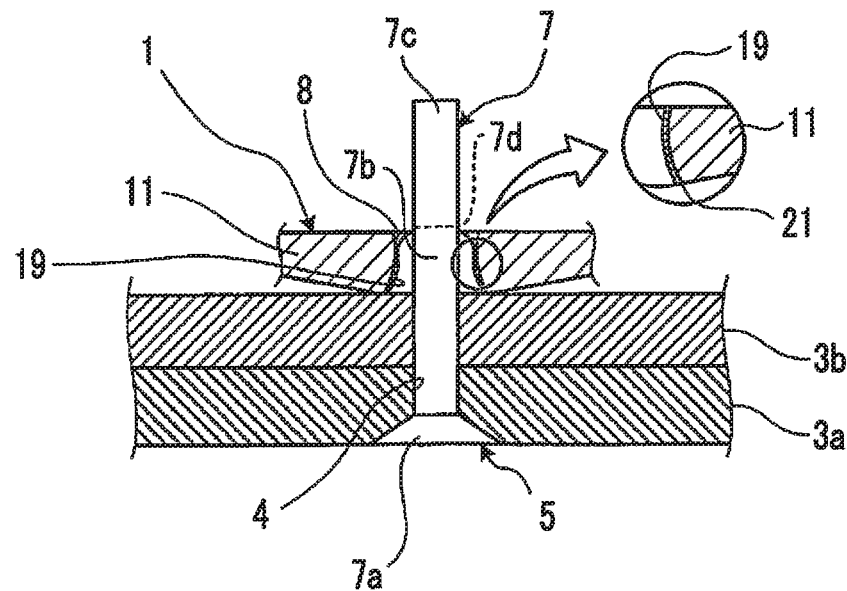
FIG. 1 is a schematic configuration diagram schematically showing a lock bolt which is fastened by a swaging tool according to Example 1.
Figure 2:
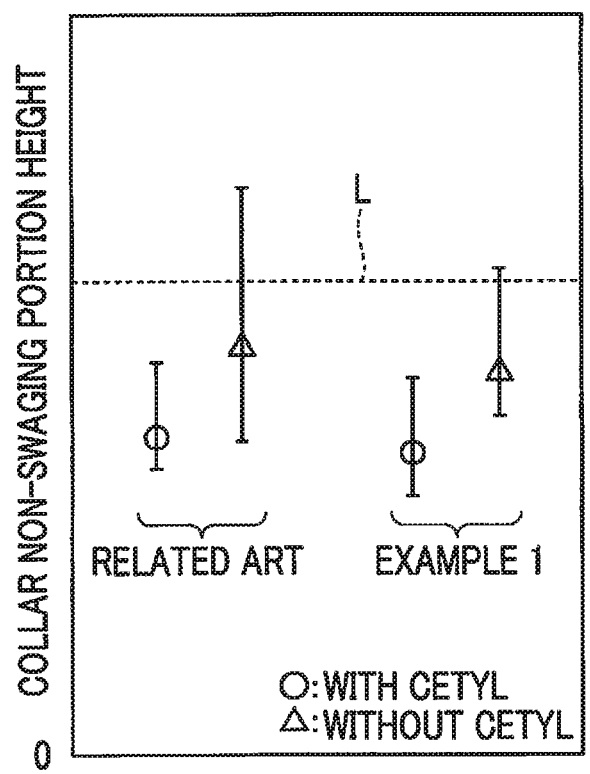
FIG. 2 is an explanatory diagram when comparing the heights of non-swaging portions of collars when using the swaging tool of Example 1 and a swaging tool of the related art.

FIG. 1 is a schematic configuration diagram schematically showing a lock bolt which is fastened by a swaging tool according to Example 1. FIG. 2 is an explanatory diagram when comparing the heights of a non-swaging portions of collars when using the swaging tool of Example 1 and a swaging tool of the related art. FIG. 3 is a table comparing coefficients of friction.

A swaging tool 1 of Example 1 is a tool for fastening a lock bolt 5 to a pair of plates 3a and 3b superimposed on each other, which is a fastened part. First, the lock bolt 5 which is fastened to the pair of plates 3a and 3b by the swaging tool 1 will be described with reference to FIG. 1.

As shown in FIG. 1, the lock bolt 5 has a fastening pin 7 which extends in an axial direction, and a collar 8 which is swaged to the fastening pin 7. The fastening pin 7 is configured to include a pinhead 7a which is provided on one side in the axial direction, a central pin main body 7b, and a pintail 7c which is provided on the other side in the axial direction. Further, a portion between the pin main body 7b and the pintail 7c becomes a breaking portion 7d, and the breaking portion 7d can be broken by applying a predetermined tensile load to the pintail 7c relative to the pin main body 7b.

The fastening pin 7 is inserted into a fastening hole 4 which is formed to penetrate in a lamination direction of the pair of plates 3a and 3b. In the fastening pin 7 which is inserted into the fastening hole 4, at the time of fastening, the pinhead 7a is located on the side of the plate 3a on one side (the lower side of FIG. 1) and the pintail 7c is located on the side of the plate 3b on the other side (the upper side of FIG. 1) across the pair of plates 3a and 3b. Further, in the pin main body 7b, a portion thereof is located in the fastening hole 4 and the other portion is located on the side of the plate 3b on the other side (the upper side of FIG. 1).

The collar 8 has a cylindrical shape and is mounted from the pintail 7c side of the fastening pin 7. The collar 8 mounted on the fastening pin 7 is moved to the plate 3b side (the pinhead 7a side) in the axial direction by the swaging tool 1, thereby being brought into contact with the plate 3b, and is swaged to the pin main body 7b of the fastening pin 7 in a state where the collar 8 is in contact with the plate 3b. Thereafter, a predetermined tensile load is applied to the fastening pin 7, whereby the breaking portion 7d is broken, and thus the pintail 7c is broken and removed.

Next, the swaging tool 1 will be described with reference to FIG. 1. As shown in FIG. 1, the swaging tool 1 has a swaging die 11 in which a swaging hole 19 for swaging the collar 8 is formed to penetrate it.

The swaging die 11 is a member which comes into contact with the collar 8 and is pushed in toward the plate 3b side. The collar 8 mounted on the fastening pin 7 is pressed by pushing the swaging die 11 in, whereby the swaging hole 19 which is formed in the swaging die 11 swages the collar 8. The shape of the inner peripheral surface of the swaging hole 19 is made to be a shape curved in a penetration direction. That is, the swaging hole 19 is made such that the diameter on the inlet side on which the collar 8 is pushed in is wider than the diameter of the collar 8 and the diameter becomes narrower as it goes toward the outlet side. Further, the swaging hole 19 has, at a top portion on the center side, the narrowest (smallest) diameter which is smaller than the diameter of the collar 8. Further, the swaging hole 19 is made to become wider as it goes toward the outlet side from the top portion on the center side.

A low-friction coating film 21 is formed on the inner peripheral surface of the swaging hole 19. The low-friction coating film 21 is formed in at least an area from the inlet side to the top portion, and in Example 1, the low-friction coating film 21 is formed on the whole surface. The low-friction coating film 21 is a film formed by diamond-like carbon coating (DLC coating). The low-friction coating film 21 formed by the DLC coating also functions as a wear-resistant coating film, and therefore, the low-friction coating film 21 is a coating film having low frictional properties and wear resistance.

Further, the DLC coating is performed by physical vapor deposition. Here, the DLC coating is performed by physical vapor deposition or chemical vapor deposition. However, in the DLC coating which is performed by the physical vapor deposition, at the time of formation of the low-friction coating film 21, it is difficult for hydrogen to be mixed in, compared to the chemical vapor deposition. For this reason, the low-friction coating film 21 DLC-coated by the physical vapor deposition can be formed in a harder film, compared to the case of DLC coating by the chemical vapor deposition. For this reason, among the DLC coatings, the low-friction coating film 21 becomes a coating film having lower frictional properties and more wear resistance. The low-friction coating film 21 formed in this manner has the coefficient of friction of less than or equal to at least 0.35, and more suitably, the coefficient of friction is less than or equal to 0.12.

Next, a fastening state of the collar 8 when using a swaging tool of the related art and a fastening state of the collar 8 when using the swaging tool 1 of Example 1 are compared with each other with reference to FIG. 2. In FIG. 2, the vertical axis thereof represents the height of a non-swaging portion of the collar 8. Further, in FIG. 2, a set of white circle and white triangle shown on the left side shows the fastening state of the collar 8 when using the swaging tool of the related art, and a set of white circle and white triangle shown on the right side shows the fastening state of the collar 8 when using the swaging tool 1 of Example 1. Here, the white circle is a case where a lubricant such as cetyl alcohol is applied to the outer peripheral surface of the collar 8, and the white triangle is a case where the lubricant such as cetyl alcohol applied to the outer peripheral surface of the collar 8 has come off. Further, a dotted line L is a prescribed line indicating a prescribed height of a swaging portion for determining whether the fastening state of the collar 8 is good or bad, and if the height of the non-swaging portion of the collar 8 is lower than the prescribed line L, the fastening state of the collar 8 is regarded as being good, and on the other hand, if the height of the non-swaging portion is higher than the prescribed line L, the fastening state of the collar 8 is regarded as being bad.

As shown in FIG. 2, in the swaging tool of the related art, in a case where the lubricant is applied to the collar 8, it was confirmed that the collar 8 could be favorably fastened. On the other hand, in the swaging tool of the related art, in a case where the lubricant is not applied to the collar 8, it was confirmed that there was a case where fastening failure of the collar 8 occurs.

In contrast, in the swaging tool 1 of Example 1, in a case where the lubricant is applied to the collar 8, it was confirmed that the collar 8 could be favorably fastened. Further, in the swaging tool 1 of Example 1, in a case where the lubricant is not applied to the collar 8, it was confirmed that the collar 8 could be nearly favorably fastened. That is, in the swaging tool 1 of Example 1, although there is a case where fastening failure of the collar 8 occurs, it was confirm that the fastening failure could be sufficiently suppressed, compared to the swaging tool of the related art.

Next, the coefficient of friction when using the swaging tool of the related art and the coefficient of friction when using the swaging tool 1 of Example 1 are compared with each other with reference to FIG. 3. In FIG. 3, the collars 8 of No. 1 to No. 3 which are samples are the collars 8 with the lubricant such as cetyl alcohol came off therefrom, and the coefficients of friction thereof are the coefficients of friction when fastening the collars 8 by using the swaging tool of the related art. In FIG. 3, the collars 8 of No. 4 and No. 5 which are samples are the collars 8 in which the lubricant such as cetyl alcohol is applied thereto, and the coefficients of friction thereof are the coefficients of friction when fastening the collars 8 by using the swaging tool of the related art. In FIG. 3, the collar 8 of No. 6 which is a sample is the collar 8 with the lubricant such as cetyl alcohol came off therefrom, and the coefficient of friction thereof is the coefficient of friction when fastening the collar 8 by using the swaging tool 1 of Example 1.

As shown in FIG. 3, in the case of No. 1, the coefficient of friction is "0.3558". In the case of No. 2, the coefficient of friction is "0.3550". In the case of No. 3, the coefficient of friction is "0.3597". From the above, the coefficient of friction when the collar 8 with the lubricant such as cetyl alcohol came off therefrom is fastened by using the swaging tool of the related art, that is, the coefficient of friction in a case where the fastening failure of the collar 8 occurs, becomes the coefficient of friction shown in each of No. 1 to No. 3.

Further, as shown in FIG. 3, in the case of No. 4, the coefficient of friction is "0.0866". In the case of No. 5, the coefficient of friction is "0.0576". From the above, the coefficient of friction when the collar 8 with the lubricant such as cetyl alcohol applied thereto is fastened by using the swaging tool of the related art, that is, the coefficient of friction in a case where the collar 8 can be favorably fastened, becomes the coefficient of friction shown in each of No. 4 and No. 5.

Further, as shown in FIG. 3, in the case of No. 6, the coefficient of friction is "0.1289". From the above, the coefficient of friction when the collar 8 with the lubricant such as cetyl alcohol came off therefrom is fastened by using the swaging tool 1 of Example 1, that is, the coefficient of friction in a case where the collar 8 can be nearly favorably fastened, becomes the coefficient of friction shown in No. 6. Accordingly, it was confirmed that it was favorable if the coefficient of friction of the low-friction coating film 21 is set to be less than or equal to at least 0.35 and the collar 8 could be nearly favorably fastened by setting the coefficient of friction to be more suitably 0.12±0.01. Accordingly, if the coefficient of friction of the low-friction coating film 21 is set to be less than or equal to 0.12, the collar 8 can be more favorably fastened.

As described above, according to the configuration of Example 1, the low-friction coating film 21 can be formed on the inner peripheral surface of the swaging hole 19 which is formed in the swaging die 11, and therefore, even if the lubricant applied to the collar 8 comes off, it is possible to suppress an increase in friction between the swaging tool 1 and the collar 8. For this reason, even if the lubricant applied to the collar 8 comes off, it becomes possible to suitably swage the collar 8 to the fastening pin 7.

Further, according to the configuration of Example 1, the coefficient of friction of the low-friction coating film 21 can be set to be less than or equal to at least 0.35 and more suitably, less than or equal to 0.12, and therefore, it is possible to suitably suppress an increase in friction between the swaging tool 1 and the collar 8.

Further, according to the configuration of Example 1, the low-friction coating film 21 is formed by performing DLC coating by physical vapor deposition, and therefore, the low-friction coating film 21 can be made to be hard, and thus the low-friction coating film 21 can become a coating film having high low-frictional properties and can become a coating film having wear resistance. For this reason, it is possible to suppress wear of the swaging hole 19 which is formed in the swaging die 11, and therefore, it is possible to attain improvement in the tool life of the swaging tool 1.

Further, according to the configuration of Example 1, the low-friction coating film 21 can be formed on the whole surface of the inner peripheral surface of the swaging hole 19. For this reason, it is possible to form the low-friction coating film 21 on the inner peripheral surface of the swaging hole 19, with which the collar 8 comes into contact, and thus it is possible to suitably reduce friction at a portion at which the inner peripheral surface of the swaging hole 19 and the collar 8 come into contact with each other. Further, in Example 1, the low-friction coating film 21 is formed on the whole surface of the inner peripheral surface of the swaging hole 19. However, it is sufficient if the low-friction coating film 21 is formed in at least an area from the inlet side to the top portion of the swaging hole 19.

Further, in Example 1, the low-friction coating film 21 is formed by the DLC coating. However, there is no limitation to this configuration. As low-friction coating, for example, diamond coating, titanium light coating, titanium aluminum coating, or the like may be applied, and it is acceptable if it is coating capable of reducing the coefficient of friction.

Further, in a case where the collar 8 with the lubricant came off therefrom is swaged by using the swaging tool 1 of Example 1, a configuration is also acceptable in which the lubricant is applied to the collar 8 again in advance and thereafter, the collar 8 is swaged. In this case, it is possible to more suitably suppress an increase in friction between the swaging tool 1 and the collar 8.

Example 2

Next, a swaging tool according to Example 2 will be described. The swaging tool according to Example 2 has a configuration in which the inner peripheral surface of the swaging hole 19 is made to be a smooth surface and the low-friction coating film 21 of the swaging tool 1 shown in FIG. 1 of Example 1 is omitted. For this reason, the drawing of the swaging tool of Example 2 corresponds to a drawing in which the low-friction coating film 21 of FIG. 1 is omitted, and therefore, the illustration of the swaging tool of Example 2 is omitted.

In the swaging tool according to Example 2, the coefficient of friction of the inner peripheral surface of the swaging hole 19 is set to be the coefficient of friction of less than or equal to at least 0.35. That is, in the swaging tool of Example 2, the inner peripheral surface of the swaging hole 19 is processed so as to become a smooth surface having the coefficient of friction of less than or equal to at least 0.35. Further, more preferably, the inner peripheral surface of the swaging hole 19 is made to be a smooth surface having the coefficient of friction of less than or equal to 0.12.

As described above, also in the configuration of Example 2, the inner peripheral surface of the swaging hole 19 which is formed in the swaging die 11 can be formed in a smooth surface having low friction, and therefore, even if the lubricant applied to the collar 8 comes off, it is possible to suppress an increase in friction between the swaging tool and the collar 8. For this reason, even if the lubricant applied to the collar 8 comes off, it becomes possible to suitably swage the collar 8 to the fastening pin 7.

REFERENCE SIGNS LIST

1: swaging tool
5: lock bolt
7: fastening pin
8: collar
11: swaging die
19: swaging hole
21: low-friction coating film

The invention claimed is:

1. A swaging tool in which a pinhead of a fastening pin is located on one side of a fastened part into which the fastening pin is inserted, a pintail of the fastening pin is located on the other side of the fastened part, a collar mounted on the pintail side of the fastening pin is moved to the pinhead side so as to come into contact with the fastened part, the collar is swaged to the fastening pin in a state where the collar is in contact with the fastened part, and a tensile load is applied to the pintail, thereby breaking and removing the pintail, whereby the fastened part is fastened, the swaging tool comprising:
    a swaging die in which there is formed a swaging hole which is brought into contact with the collar, thereby swaging the collar,
    wherein a low-friction coating film is evaporated on an inner peripheral surface of the swaging hole, and a lubricant is applied to the collar before the collar is swaged.

2. The swaging tool according to claim 1, wherein a coefficient of friction of the low-friction coating film is less than or equal to 0.35.

3. The swaging tool according to claim 2, wherein the coefficient of friction of the low-friction coating film is less than or equal to 0.12.

4. The swaging tool according to claim 1, wherein the low-friction coating film also has a function as a wear-resistant coating film.

5. The swaging tool according to claim 1, wherein the low-friction coating film is a film formed by diamond-like carbon coating.

6. The swaging tool according to claim 5, wherein the diamond-like carbon coating is performed by physical vapor deposition.

7. The swaging tool according to claim 1, wherein the swaging hole is formed such that a diameter thereof is wide on the inlet side on which the collar is pushed in, and is the narrowest at a top portion on the center side, and is wider than the diameter in the top portion on the outlet side, and
    the low-friction coating film is formed in at least an area from the inlet side to the top portion of the swaging hole.

8. A swaging tool in which a pinhead of a fastening pin is located on one side of a fastened part into which the fastening pin is inserted, a pintail of the fastening pin is located on the other side of the fastened part, a collar mounted on the pintail side of the fastening pin is moved to the pinhead side so as to come into contact with the fastened part, the collar is swaged to the fastening pin in a state where the collar is in contact with the fastened part, and a tensile load is applied to the pintail, thereby breaking and removing the pintail, whereby the fastened part is fastened, the swaging tool comprising:
    a swaging die in which there is formed a swaging hole which is brought into contact with the collar, thereby swaging the collar,
    wherein a low-friction coating film is formed on an inner peripheral surface of the swaging hole, and
    wherein the low-friction coating film is a film formed by diamond-like carbon coating.

9. The swaging tool according to claim 8, wherein the diamond-like carbon coating is performed by physical vapor deposition.

* * * * *